United States Patent [19]

Bacharach

[11] 4,456,267
[45] Jun. 26, 1984

[54] SEAL ARRANGEMENT FOR PULL RODS IN ROLLING MILLS

[75] Inventor: Ottmar Bacharach, Kaiserslautern, Fed. Rep. of Germany

[73] Assignee: Gebr. Pfeiffer AG, Kaiserslautern, Fed. Rep. of Germany

[21] Appl. No.: 438,470

[22] Filed: Nov. 2, 1982

[30] Foreign Application Priority Data

Nov. 3, 1981 [DE] Fed. Rep. of Germany ....... 3143463

[51] Int. Cl.³ .............................................. F16J 15/16
[52] U.S. Cl. .............................. 277/30; 277/212 FB; 74/18.1
[58] Field of Search ............. 277/30, 212 FB; 72/245, 72/231; 241/101.2; 74/18.1, 18.2, 18

[56] References Cited

U.S. PATENT DOCUMENTS

| | | | |
|---|---|---|---|
| 909,263 | 1/1909 | Walters | 277/30 |
| 2,196,676 | 4/1940 | Johnson et al. | 277/30 |
| 3,186,722 | 6/1965 | Johnston | 277/30 X |
| 4,022,424 | 5/1977 | Davis et al. | 277/30 X |
| 4,185,837 | 1/1980 | Greene | 277/30 X |
| 4,191,387 | 3/1980 | Kirchoff | 277/30 X |

FOREIGN PATENT DOCUMENTS

| | | | |
|---|---|---|---|
| 0677878 | 7/1939 | Fed. Rep. of Germany | 277/30 |
| 1491446 | 7/1967 | France | 277/112 FB |

*Primary Examiner*—John M. Jillions
*Attorney, Agent, or Firm*—Toren, McGeady and Stanger

[57] ABSTRACT

A seal arrangement is provided for the pull rods extending out of a rolling mill housing through a housing passageway where a spring suspension is located at the ends of the pull rods exteriorly of the housing. In such an arrangement pull rods experience motion in the axial and radial directions. In affording a satisfactory seal, the pull rods extend through a sleeve as they pass from the interior of the housing into the housing passageway. A first ball-and-socket joint is located within the sleeve closely enclosing the pull rod. A second ball-and-socket joint is located around the exterior of the sleeve within the housing passageway. In pressure mills, a sealing air connection may be provided for the housing passageway and a further seal provided by a bellows located on the exterior of the housing extending between the pull rod and the outlet from the housing passageway.

4 Claims, 2 Drawing Figures

SEAL ARRANGEMENT FOR PULL RODS IN ROLLING MILLS

SUMMARY OF THE INVENTION

The present invention relates to a seal arrangement for pull rods used in rolling mills. Such pull rods extend from the pressure frame inside the rolling mill to the exterior of the mill exiting through a housing passageway from the mill housing. The pull rods must be sealed in the region of the housing passageway.

In so-called spring-stressed mills, the pull rods are practically stationary so that a conventional stuffing box seal is adequate. Another known so-called slide seal may also be used for the pull rods, however, such a seal admits a relatively large amount of air and, as a result, is unable to prevent the escape of substances from the mill. If escaped substances from the mill reach at least in part the hot gas space of the mill, explosions may take place, particularly if the product being milled is coal. Finally, this slide seal is not suitable for pressure mills, that is, where a positive pressure exists within the mill as compared to ambient pressure.

Therefore, with known seals it has not been possible to provide an effective sealing action when the pull rods are equipped at their lower or free ends outside of the mill housing with a spring suspension, such as a hydropneumatic spring suspension. Such pull rods experience oscillating axial motions along with motions perpendicular to the axis of the pull rod.

Therefore, the primary object of the present invention is to provide a suitable seal arrangement for pull rods with hydropneumatic spring suspension where they exit from the mill housing.

Such a sealing arrangement is useful in positive pressure mills as well as in the frequently built and used negative pressure mills. In negative pressure mills, the pressure differential between the mill interior and the ambient atmosphere is sufficient to draw in sealing air for preventing the escape of substances from the mill. In positive pressure mills it must be possible to connect the seal arrangement to the sealing air system of the grinding rolls and prevent the loss of sealing air to the outside.

In accordance with the present invention, the seal arrangement for pull rods used in rolling mills involves the use of two ball-and-socket joints with one joint closely enclosing the pull rod and positioned within a sleeve laterally enclosing the pull rod, while the second joint supports the sleeve in the housing passageway extending out of the mill housing.

Preferably, the ball-and-socket joints may be formed of steel.

The ball-and-socket joint closely enclosing the pull rod absorbs the oscillating axial motion of the pull rod in the manner of a friction bearing. Movement of the pull rod in the radial direction caused by the movement of the pressure frame within the mill is absorbed by the ball-and-socket joint closely enclosing the pull rod as well as by the other ball-and-socket joint positioned between the sleeve and the housing passageway.

A sealing air connection is provided within the housing passageway and, at the outlet of the housing passageway, an additional seal is provided for the pull rod, for instance a bellows, in the event the sealing arrangement is used in a pressure mill. The sealing air connection and the bellows can be omitted in negative pressure mills.

If the entire construction is formed of steel or of materials with comparable characteristics, the flexible seal arrangement is particularly insensitive to temperature influences. In negative pressure mills, due to the pressure drop between the ambient atmosphere and the mill housing interior, the seal arrangement is protected against dust because fresh air acting as sealing air passes through the bearing gap from the outside to the inside and keeps the joints clean. The reverse applies in positive pressure mills when a sealing air connection and a bellows is used. The bellows prevents any loss or sealing air to the ambient atmosphere.

Due to the seal arrangement for pull rods in rolling mills embodying the present invention, hydropneumatic spring suspension can be used for the pull rods preferably for pressure mills and in particular for carbon mills. In particular, the sealing arrangement affords protection against explosion.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
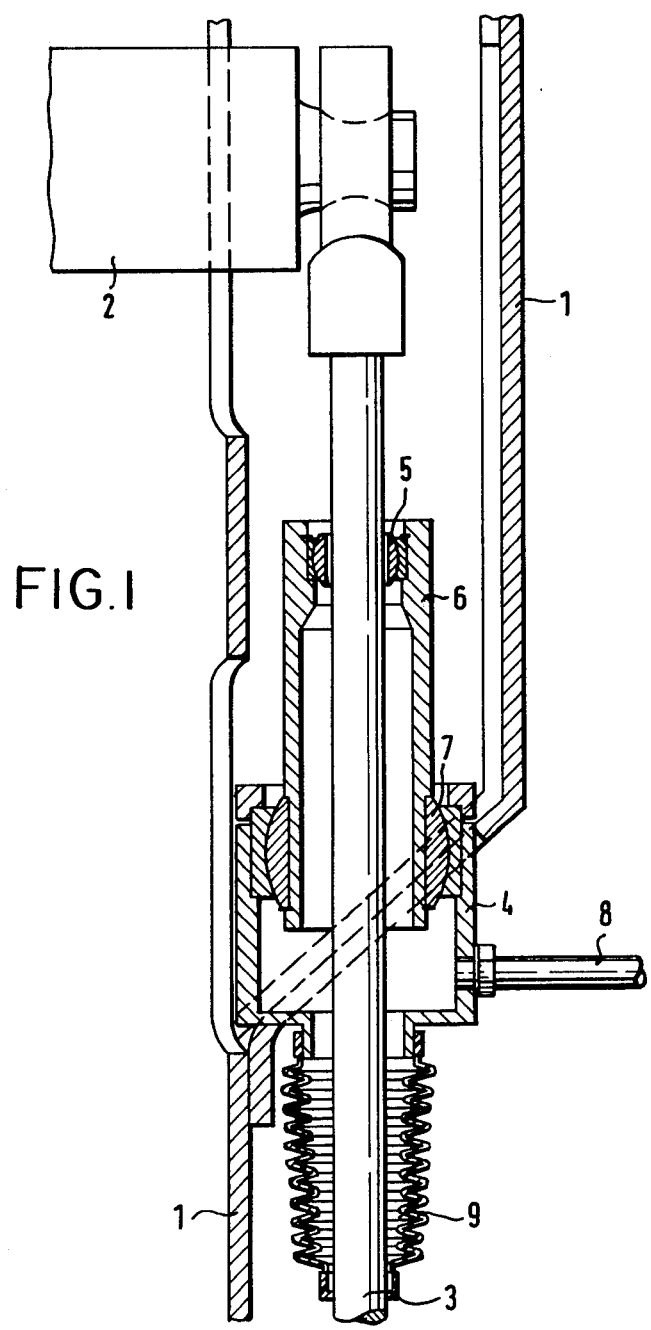
FIG. 1 is a schematic representation of a part of a rolling mill housing embodying the present invention.
Figure 2:
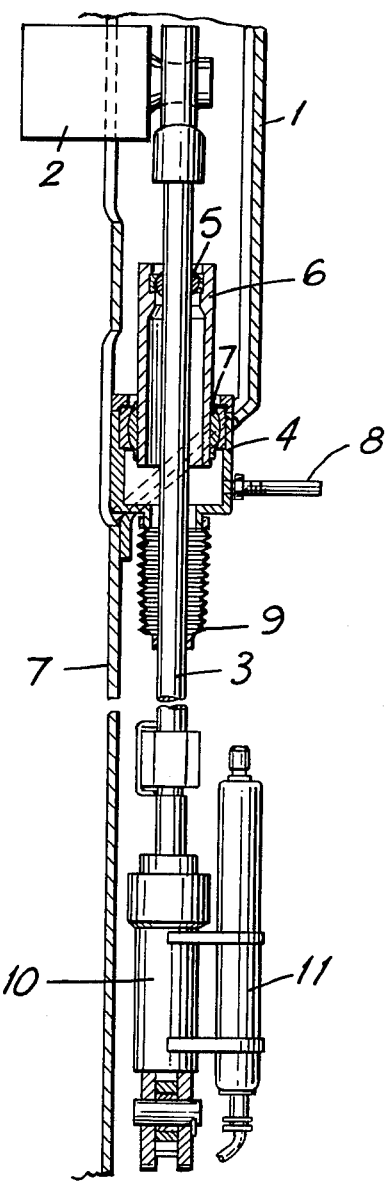
FIG. 2 is a schematic view similar to FIG. 1 illustrating a hydropneumatic spring suspension on the end of a pull rod.

The drawing is a schematic illustration of a mill housing 1 for a rolling mill or a vertical mill showing only a pressure frame 2 for the grinding rollers within the upper part of the housing. Pull rods 3 extend downwardly from the pressure frame 2 and pass from the interior of the mill housing 1 through a housing passageway 4 to the exterior of the housing. A hydropneumatic spring suspension, note FIG. 2, is provided at the lower free end of the pull rod 3. The hydropneumatic spring suspension includes a tension cylinder 10 and a pressure storage member 11. The pull rod transfers the forces of the spring suspension to the pressure frame 2. When using such a hydropneumatic spring suspension, problems occur in that the pull rods 3 first experience movement in the axial direction and then movement in the radial direction because they are acted upon by the pressure frame 2. Accordingly, known seal arrangements have not been suitable for such pull rods.

In accordance with the present invention, a seal arrangement is provided including two ball-and-socket joints formed of steel. As shown in the drawing, an upper smaller ball-and-socket joint 5 closely encloses the pull rod 3 providing a narrow bearing gap therebetween. A sleeve 6 laterally encloses an axial portion of the rod 3 from a location within the mill housing 1 to a location within the housing passageway 4. As viewed in the drawing, the upper end of the sleeve 6 is located within the housing and the lower end is located within the housing passageway. Another ball-and-socket joint 7, larger than the joint 5, is positioned around and in contact with the exterior of the sleeve 6 and with the interior of the housing passageway 4. Due to the combined action of these two joints, it is possible to absorb all conceivable combinations of motions or movements of the pull rods 3 and to create, at the same time, an effective seal between the interior of the mill housing 1 and the ambient atmosphere.

In positive pressure mills, a sealing air line 8 is connected to the housing passageway 4 and, in turn, is connected with the sealing air system for the grinding rolls. At the outlet from the housing passageway 4, the pull rod 3 is enclosed within a bellows 9 for preventing any loss of sealing air to the ambient atmosphere. As viewed in the drawing, the bellows is connected at its upper end to the outlet from the housing passageway 4 and at its lower end to the pull rod.

In a negative pressure mill, the sealing air connection and the bellows can be omitted. In such a mill, due to the pressure differential between the interior of the mill and the ambient atmosphere, sufficient sealing air is drawn in from the outside.

While specific embodiments of the invention have been shown and described in detail to illustrate the application of the inventive principles, it will be understood that the invention may be embodied otherwise without departing from such principles.

I claim:

1. A seal arrangement comprising a rolling mill housing, means mounted in said mill housing for forming a housing passageway connecting the interior and exterior of said housing, a pull rod located within said housing and extending through said housing passageway to the exterior of said housing, said pull rod arranged to have a hydropneumatic spring suspension on the free end thereof located outside said housing, wherein the improvement comprises a sleeve laterally enclosing and spaced outwardly from said pull rod, said sleeve extending from the interior of said housing into said housing passageway, a first ball-and-socket joint located within said sleeve and closely laterally enclosing said pull rod forming a narrow bearing gap therebetween, a second ball-and-socket joint located within said housing passageway and laterally enclosing and supporting the outer surface of said sleeve, a sealing air connection is provided at said housing passageway for introducing sealing air into said housing passageway, and means for forming a seal around said pull rod at the outlet from said housing passageway to the exterior of said housing.

2. A seal arrangement, as set forth in claim 1, wherein said first and second ball-and-socket joints are formed of steel.

3. A seal arrangement, as set forth in claim 1, wherein said sealing means comprises a bellows laterally enclosing said pull rod and secured at one end to the outlet from said housing passageway and at the other end to said pull rod at a position spaced axially outwardly from the outlet from said housing passageway.

4. A seal arrangement, as set forth in claim 1, wherein said sleeve has a first end located within said housing and a second end located within said housing passageway, said first ball-and-socket joint located within said sleeve adjacent the first end thereof, and said second ball-and-socket joint located around the exterior of said sleeve adjacent the second end thereof.

* * * * *